Patented May 9, 1950

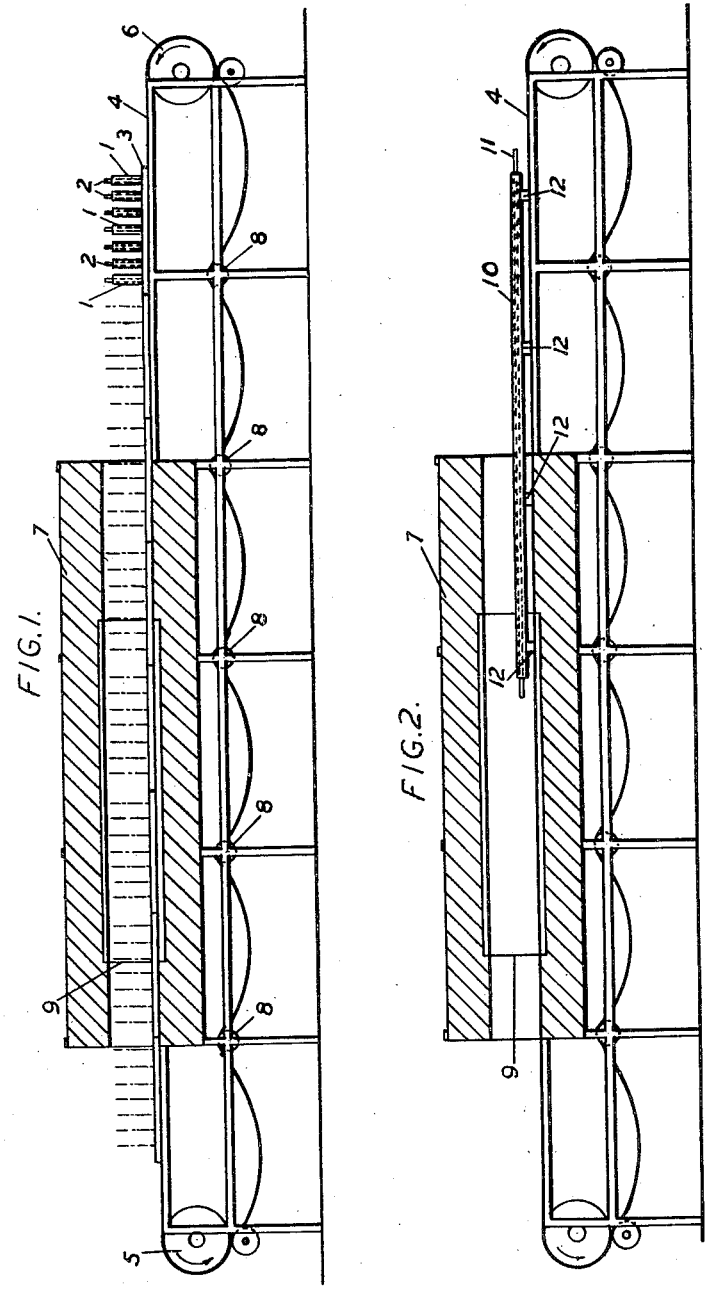

2,507,300

UNITED STATES PATENT OFFICE 2,507,300

PRODUCTION OF GLASS AND OTHER THERMOPLASTIC TUBES

Samuel James Everett, Thornton Heath, England

Application November 17, 1948, Serial No. 61,021
In Great Britain November 28, 1947

5 Claims. (Cl. 49—84)

This invention relates to the production of tubes of glass or other thermoplastic materials with a finely finished internal surface and accurate bore in comparison with that of ordinary commercial tubing and is particularly applicable to the formation of tubes with extremely accurate bores of constant diameter such as is needed, for example, for glass barrels for hypodermic and similar syringes.

Accurately formed glass tubing has already been made by drawing glass or other tubes over a circular mandrel of constant diameter while passing the tube through a heating zone and the mandrel has preferably been rotated during the process; another method for producing tubing with an accurate bore but with a varying section has been to use a mandrel having two or more lengths each of constant section and rapidly reciprocating the mandrel to prevent the tubing from sticking to it and to assist the feed of the tubing. In most cases the interior of the tube has been fully or partly evacuated in order to utilise the pressure of the surrounding atmosphere to press the glass on to the mandrel. Such processes yield quite accurate results, but in cases in which extreme accuracy, that is to say within limits of the order of less than one tenth of a thousandth of an inch, is required, such processes are not sufficiently accurate nor can absolute straightness of the tubes produced be guaranteed. Various solutions of the problem of overcoming small inaccuracies in the bore of the tube have been tried, one of the most successful being to apply pressure to the outside of the tube around a mandrel of the desired precise dimensions while heating and, of course, making allowances for the difference in the co-efficient of expansion of the glass or other plastic material and the metal of the mandrel, so that on reaching room temperature the mandrel can be removed and the bore of the tube is of the desired size. However, a seal has to be formed if a difference of pressure is to be set up between the outside and inside of the tube, with the result that the cropped ends of the tube are waste and short lengths of tubing cannot be handled because there is not sufficient length to form the necessary seal.

The main object of the present invention is the production of glass tubing of high order of accuracy suitable for syringe barrels as well as other purposes. The invention aims at using tubing of no particular accuracy, although tubes formed by the process mentioned above can be employed as the starting material. The invention makes it possible to apply markings or other graduations by means of the usual ceramic transfers or to use for this purpose glass powder having a comparatively high melting point and also high chemical resistance. Even with the ordinary transfers, however, the invention enables much higher chemical resistance to be attained than if the transfer were fired by the ordinary process of heat treatment at a lower temperature than the softening point of the tubing to which the transfer is applied.

According to the present invention, mandrels are employed with a relatively high co-efficient of expansion compared with the tubing material and, for example, the steel sold under the name "Staybrite" or that sold under the name "Stellite" may be used; the former has a co-efficient of expansion of about $17^{10-6}$ and the latter a co-efficient of about $10^{10-6}$, which is considerably higher than that of the glass which may be for example, $8 \times 10^{-6}$. The tubes used must have a bore at room temperature slightly smaller than the desired finished size and the mandrel must just fit into the tube used at the room temperature. It is found that when heating is carried out owing to the higher expansion of the mandrel, the latter, at a temperature at which the glass has become slightly plastic, has become enlarged so as to force out the glass tubing and thereby to increase its bore to the desired precise size.

If the deviation from the desired size in the starting material is greater than the amount of stretching which can conveniently be produced in a single operation it is necessary to carry out the stretching as the result of two or more successive operations, the mandrel employed in each operation being greater in diameter than that employed in the preceding operation by substantially the amount of stretch produced by that preceding operation. In the final operation it is desirable to use a mandrel made of the steel sold under the name of "Stellite," already referred to.

Two forms of apparatus suitable for carrying out the method according to the invention will now be described by way of example with reference to the accompanying drawings, of which:

Figure 1 shows diagrammatically in elevation an apparatus suitable for treating tubing in short lengths; and Figure 2 is a corresponding view of an apparatus for treating tubing in longer lengths.

Referring first to Figure 1, a typical application of this apparatus is to the production of lengths of glass tubing suitable for syringe barrels. In this case the starting material is either carefully sorted standard glass tubing or preferably lengths taken from a batch of tubing produced by the methods already referred to. The lengths of tubing 1 are placed over mandrels 2 slightly longer than the tubing and upstanding from a base 3 carrying, in this particular instance, seven mandrels. The base together with its associated mandrels and lengths of tubing is then placed on a reticular heat-proof conveyor 4 passing over a driven pulley 5 and kept taut by braking on a pulley 6. The conveyor passes through a muffle furnace 7 and is supported on its return path by pulleys 8. The heating zone of the furnace is indicated by the area enclosed by the dotted line 9 and this is heated to the softening temperature of the glass tubing, the speed of the conveyor being such as to allow the lengths of tubing to reach the temperature of the furnace during their passage. After they have passed through the furnace the bases 3 are removed from the conveyor and the whole is allowed to cool, after which the lengths of tubing are removed from the mandrels. If further stretching is necessary, the lengths of tubing are then placed on slightly larger mandrels and again passed through the furnace.

When treating Pyrex glass the furnace temperature is controlled at 720° C. and in a particular furnace having a heating zone 3 feet 8 inches long the conveyor runs at a speed of 4.38 minutes per foot.

An example of the tubing treated in this furnace are syringe barrels 7 centimetres long and having a final internal bore of 8.760 millimetres. The starting material is glass tubing of the correct length but varying in bore from 8.745 mm. to 8.750 mm. This is first graded into two fractions, one having bores tending towards the lower limit and the other towards the upper limit. All the lengths of tubing are then carefully cleaned to ensure that they are free from dust and other foreign matter. The fraction of smaller bore is first given an initial stretch on mandrels of Staybrite steel having a diameter at room temperature of 8.680 mm. All the lengths of tubing are then stretched on mandrels of Staybrite steel having a diameter at room temperature of 8.690 mm. When cool the tubing contracts to the desired final bore of 8.760 mm.

When treating longer lengths of tubing and therefore using longer mandrels it is important to avoid nipping of the mandrels over the long lengths by the tubing, since the greater contraction of the mandrels on cooling may produce stress in the enlarged tube of a sufficient magnitude to cause rupture of the tube before the latter has contracted sufficiently to resist the stress. Apparatus suitable for treating such longer lengths of tubing is shown in Figure 2. A similar furnace 7 and conveyor 4 are employed, but the tubing 10 is passed lengthwise through the heating zone 9. For this purpose the tubing is threaded over a mandrel 11, which extends beyond each end of the tubing, and is supported on the conveyor by V-blocks 12. The heating and cooling of the tubing is thus progressive and any danger of nipping the mandrel is eliminated.

In either form of apparatus transfers of any of the kinds already mentioned for producing graduations and other marks may be applied to the tubes before treatment. Markings in relief or intaglio may also simply be applied to the inner walls of the tubes. Tubes may be formed having lengths of different diameters, but in such a case longitudinal grooves below the surface should be avoided as the tubing material will not accurately accommodate itself to such grooves.

I claim:

1. A method of producing a thermoplastic tube having an accurately finished bore, comprising inserting a mandrel into a length of open ended tubing, said mandrel being of a material having a coefficient of thermal expansion high relatively to that of said tubing and having an external diameter slightly less than the internal diameter of said tubing, concurrently heating said tubing and said mandrel to the softening point of said tubing and until said mandrel expands into contact with the interior wall of said tubing, stretching said tubing by continuing said concurrent heating until said mandrel expands to an external diameter greater than the internal diameter of said tubing, and cooling said tubing and said mandrel to free said tubing from said mandrel.

2. A method of producing a thermoplastic tube having an accurately finished bore, comprising inserting a mandrel into a length of open ended tubing, said mandrel being of a material having a coefficient of thermal expansion high relatively to that of said tubing and having an external diameter slightly less than the internal diameter of said tubing, concurrently heating said tubing and said mandrel to the softening point of said tubing and until said mandrel expands into contact with the interior wall of said tubing, stretching said tubing by continuing said concurrent heating until said mandrel expands to an external diameter greater than the internal diameter of said tubing, cooling said tubing and said mandrel, inserting a second mandrel having a coefficient of thermal expansion high relatively to that of said tubing and of somewhat larger diameter than said first-named mandrel, currently heating said tubing and second mandrel in order further to stretch said tubing and cooling said tubing and said second mandrel.

3. A method of producing a thermoplastic tube having an accurately finished bore, comprising inserting a stainless steel mandrel into a length of open ended tubing, said stainless steel having a coefficient of thermal expansion high relatively to that of said tubing and having an external diameter slightly less than the internal diameter of said tubing, concurrently heating said tubing and said mandrel to the softening point of said tubing and until said madrel expands into contact with the interior wall of said tubing, stretching said tubing by continuing said concurrent heating until said mandrel expands to an external diameter greater than the internal diameter of said tubing, and cooling said tubing and said mandrel to free said tubing from said mandrel.

4. A method of producing a thermoplastic tube having an accurately finished bore, comprising inserting a mandrel into a short length of open ended tubing, said mandrel being of a material having a coefficient of thermal expansion high relatively to that of said tubing and having an external diameter slightly less than the internal diameter of said tubing, supporting said mandrel and tubing in a vertical position and traversing said mandrel and said length of tubing horizontally into a heating zone so as concurrently to heat said mandrel and said length of tubing to the softening point of said tubing and until said mandrel expands into contact with the interior wall of said tubing, stretching said tubing by continuing said concurrent heating in said heating zone until said mandrel expands to an external diameter greater than the internal diameter of said tubing, and removing said tubing and mandrel from said heating zone to permit cooling and freeing of the tubing from the mandrel.

5. A method of producing a thermoplastic tube having an accurately finished bore, comprising inserting a mandrel into a long length of open ended tubing, said mandrel being of a material having a coefficient of thermal expansion high relatively to that of said tubing and having an external diameter slightly less than the internal diameter of said tubing and traversing said mandrel and said length of tubing lengthwise through a heating zone so as to heat said mandrel and said length of tubing progressively and concurrently to the softening point of said tubing and until said mandrel expands into contact with the interior wall of and to a greater external diameter than the internal diameter of the tubing to stretch said tubing, and so also as to cool said mandrel and said length of tubing progressively when leaving said heating zone.

SAMUEL JAMES EVERETT.

REFERENCES CITED

The following references are of record in the file of this patent:

UNITED STATES PATENTS

| Number | Name | Date |
|---|---|---|
| 1,999,525 | Morscholz | Apr. 30, 1935 |
| 2,215,041 | Hostetter | Sept. 17, 1940 |